United States Patent [19]

Graham, Jr.

[11] Patent Number: 4,569,389

[45] Date of Patent: Feb. 11, 1986

[54] LASER-HYDROGEN HEATING ELEMENT

[75] Inventor: Merrill E. Graham, Jr., Tehachapi, Calif.

[73] Assignee: Graham Family Trust, Tehachapi, Calif.

[21] Appl. No.: 661,031

[22] Filed: Oct. 15, 1984

[51] Int. Cl.$^4$ ............................................. F28D 21/00
[52] U.S. Cl. .............................. 165/104.12; 126/400; 126/426
[58] Field of Search .......................... 432/1, 28, 29, 30; 126/400, 436; 165/1, 104.12

[56] References Cited

U.S. PATENT DOCUMENTS

| | | | |
|---|---|---|---|
| 3,994,675 | 11/1976 | Sasse et al. | 432/1 |
| 4,113,589 | 9/1978 | Leach | 250/527 |
| 4,148,701 | 4/1979 | Leach | 250/527 |
| 4,193,879 | 3/1980 | Leach | 250/527 |
| 4,247,379 | 1/1981 | Leach | 204/157.1 R |
| 4,424,805 | 1/1984 | Neary | 126/452 |
| 4,495,985 | 1/1985 | Feldman | 165/104.12 |

OTHER PUBLICATIONS

Scientific American, "Nitrogen Laser", Jun. 1974, pp. 40-45.

Primary Examiner—Howard S. Williams
Attorney, Agent, or Firm—Mallinckrodt, Mallinckrodt, Russell & Osburn

[57] ABSTRACT

A heating element includes a sealed chamber containing hydrogen gas and a source of high energy light adapted to direct such high energy light into the hydrogen in the chamber to cause disassociation of the hydrogen molecules into hydrogen atoms whereby when the hydrogen atoms recombine to produce hydrogen molecules, heat is generated to heat the container. In addition, a method of heating a container comprises the steps of filling the container with hydrogen gas, directing high energy light into the hydrogen gas to cause disassociation of the hydrogen molecules into hydrogen atoms, and allowing the hydrogen atoms to recombine to form hydrogen molecules thereby giving off heat.

19 Claims, 9 Drawing Figures

LASER-HYDROGEN HEATING ELEMENT

BACKGROUND OF THE INVENTION

1. Field

The invention is in the field of heating devices.

2. State of the Art

Most devices currently in use for generating heat burn a fuel to generate the heat or use electricity flowing through a resistance to generate heat. It is also known that hydrogen molecules can be disassociated into hydrogen atoms and then recombined into hydrogen gas molecules with the resultant release of large amounts of heat energy. This principal is used in an "atomic-hydrogen" torch where the hydrogen molecules are passed through an electric arc to disassociate them into hydrogen atoms and the hydrogen atoms then recombine against the surface to be heated where temperatures in excess of 4000° C. can be obtained.

It is known that many lasers can generate high power laser light beams with relatively small power input, but lasers have not been used as heat sources.

SUMMARY OF THE INVENTION

According to the invention, a heating device includes a sealed chamber containing hydrogen gas and a laser adapted to direct a laser light beam into the chamber. The laser light causes disassociation of the hydrogen molecules in the chamber into hydrogen atoms, which then recombine to form hydrogen gas molecules with the resultant release of heat energy. The chamber is made with walls of heat conductive material to conduct the heat from the gas thereby causing heating of the walls of the chamber which may be used as a heating element for a variety of purposes such as heating water or air.

In its presently preferred form, the hydrogen chamber is built with a window at one end through which the laser beam enters. The laser is preferably a nitrogen laser and a resonator is provided between the laser and the hydrogen chamber or within the hydrogen chamber to increase the frequency of the laser light thereby decreasing its wavelength to between 500 and 2000 angstroms which is the wavelength range most effective for breaking up the hydrogen molecules.

THE DRAWINGS

In the accompanying drawings, which illustrate an embodiment of the invention constituting the best mode presently contemplated for carrying out the invention in actual practice:

FIG. 1 is a block diagram showing schematically an arrangement of the invention;

FIG. 2, a block diagram showing schematically an arrangement of the invention which additionally includes a resonator;

FIG. 3, a block diagram showing schematically a second arrangement of the invention including a resonator;

FIG. 4, a side elevation of a hydrogen chamber of the invention;

FIG. 5, a vertical section taken on the line 5—5 of FIG. 4;

FIG. 6, an end elevation looking at the left end of the chamber of FIG. 4;

FIG. 7, a fragmentary horizontal section taken on the line 7—7 of FIG. 6;

FIG. 8, a vertical section of a resonator of the invention for increasing the frequency of the light in the laser beam; and FIG. 9, a vertical section of a second embodiment of a resonator.

DETAILED DESCRIPTION OF THE ILLUSTRATED EMBODIMENT

Figure 1:

The basic invention is shown schematically in FIG. 1 as a hydrogen chamber and a laser.

The hydrogen chamber may take the form of a cylinder 10 made of a relatively good heat conducting material such as a metal like steel, stainless steel, or copper having end plates 11 and 12 of similar material sealingly secured thereto such as by welding. End plate 12 has a circular opening 13 therein which is sealed by a disc 14 of transparent material such as glass or plastic with a gasket 15 placed between the end plate 12 and disc 14 to ensure a good seal. Sealing pressure is applied against disc 14 and gasket 15 by ring 16 and nuts 17 which are tightened on studs 18 against ring 16.

Transparent disc 14 provides a window into the sealed hydrogen chamber through which light can pass. Disc 14 is also easily removable for cleaning or replacement if it should become dirty, discolored, or damaged. A plurality of heat transfer fins 19 are provided about the outside of cylinder 10.

The laser is preferably a nitrogen laser, such as that shown and described in the June 1974 issue of Scientific American. The nitrogen laser produces short pulses of ultraviolet laser light with a wavelength of 3,371 angstroms. Most lenses and most kinds of glass are transparent to this frequency of light. The laser produces short pulses on the order of 5 to 10 nanoseconds of very high power, up to one million watts, from a source of power such as a neon-sign transformer with a rated output of 20 milliamperes. The construction of such laser is shown and described in the referenced article so will not be detailed here. The actual construction of the laser forms no part of the invention.

The laser is positioned with respect to the hydrogen chamber so that the light from the laser is directed through the window formed by disc 14 into the hydrogen in the chamber. The light striking the hydrogen molecules in the chamber cause disassociation of the hydrogen molecules into hydrogen atoms. After disassociation of the molecules into atoms, the atoms will recombine into molecules. When the hydrogen atoms recombine to form hydrogen molecules, there is a release of 104.2 kcal of heat for each recombined molecule. This same amount of energy was required to separate the hydrogen molecules and came from the energy in the laser light beam as the photons of light collided with the hydrogen molecules.

While the laser beam from a nitrogen laser with a light wavelength of 3371 angstroms will cause disassociation of the hydrogen molecules and satisfactory heat output for the device, since hydrogen molecules are particularly sensitive to light of a wavelength in the range of 500 to 2000 angstroms, will a wavelength of about 1200 angstroms being optimum, it is preferred that the laser light beam be passed through a resonator to increase its frequency to the desired wavelength. Resonators are well known and any resonator that shifts the frequency of the incoming light to a frequency in the desired range may be used.

Figure 7:
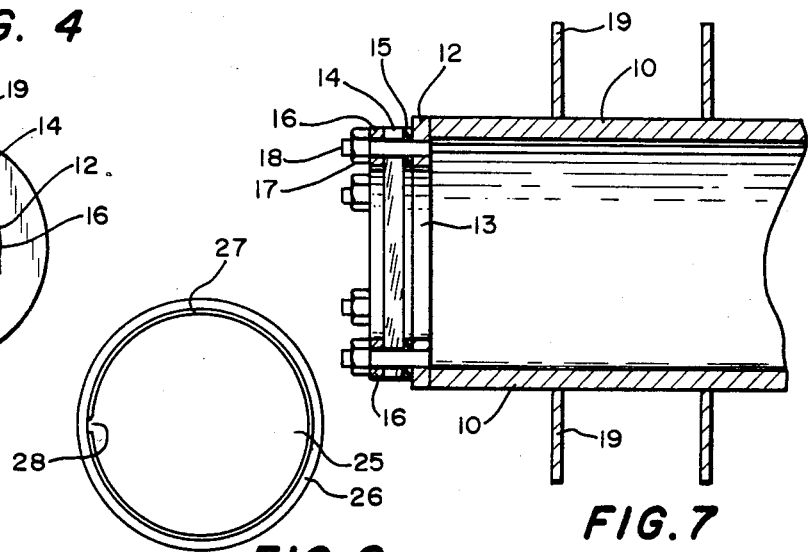
Figure 9:
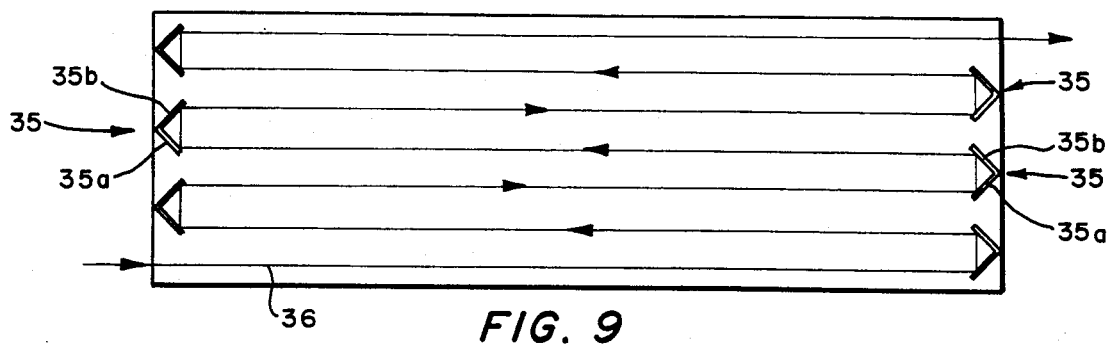

One common type of resonator is shown in FIG. 7 and takes the form of a spherical or cylindrical cavity 25 formed by wall 26 made of a material which is transparent to light of the incoming and desired frequencies of light. A reflecting surface 27 which is reflective to frequencies of light other than the desired output frequency coats the inside of the cavity. For example, the cavity may be formed of various types of glass or plastic. The reflecting surface may be a layer of aluminum a few angstroms thick. At this thickness, it has been found that aluminum is essentially tranparent to light wavelengths shorter than about 2000 angstroms. The aluminum is removed from a small area 28 of the cavity which serves as a window for the laser light from the nitrigen laser of 3371 angstroms to enter the cavity. The window and laser are set so that the light enters at an angle. Once in the cavity, the light will bounce around being reflected by reflecting surface 27. With the size of the cavity set as described below, the light bouncing around in the cavity will be compressed and thereby its frequency increased. As the light frequency increases so the light has a wavelength below 2000 angstroms, the aluminum coating becomes transparent to such light and it travels through the coating 27 and wall 26 and exits the cavity.

In order to increase the frequency of light in the cavity, the size of the cavity and the angle of the incoming light must be such that when reflected by surface 27, the distance between each subsequent point of reflection must be an integral number of half wavelengths of the desired output frequency. Using the formula $\lambda = (c/2L)$ where $\lambda$ = the desired wavelength, c = the speed of light, and L = the distance between subsequent reflections, the required distance is found as $L = (c/\lambda)$. This L equals one half of the desired wavelength and the actual distance between reflections may be any multiple of this one half wavelength.

Figure 2:
Figure 3:
Figure 4:
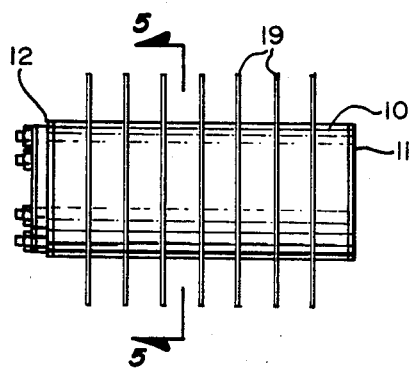
Figure 5:
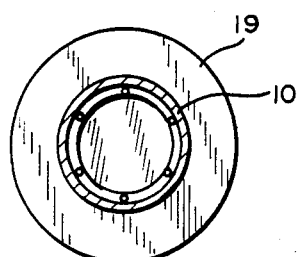
Figure 6:
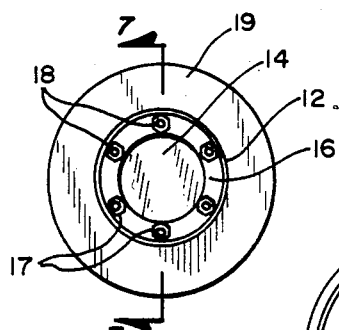

A resonator as shown in FIG. 7 may be conveniently located inside the hydrogen chamber as indicated schematically in FIG. 3 so that the incoming light from the laser enters the resonator as it enters the hydrogen chamber. The light's frequency is increased to a frequency in the range to which hydrogen is most sensitive and as the light of that frequency leaves the resonator, it causes the disassociation of the hydrogen. Alternatively, the resonator may be located outside the hydrogen chamber as shown schematically in FIG. 2 so that light of the desired frequency leaving the resonator passes through the window into the chamber.

Figure 8:
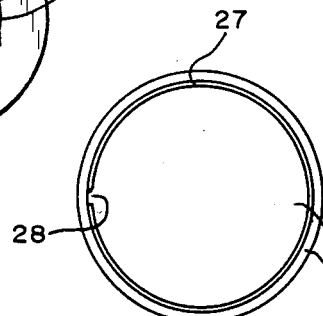

If an inline resonator as indicated by FIG. 2 is desired, a preferred resonator as shown in FIG. 8, can be made using a series of reflecting mirrors 35 each having two reflecting surface 35a and 35b. With each mirror, the light beam, indicated as 36, hits reflecting surface 35a, is reflected at a right angle to reflecting surface 35b and is again reflected at a right angle to leave mirror 35 as a beam parallel to the incoming beam but traveling in the opposite direction. Each reflecting surface 35a and 35b is at an angle of 45° to the incident beam and the two reflecting surfces form a 90° angle. By adjusting the distance between mirrors 35 and reflecting surface 35a and 35b to be a multiple of the half wavelength of the desired frequency, and providing enough mirrors 35, the wavelength of the incoming beam of light can be shifted upwardly to the desired frequency. The resonator of FIG. 8 provide excellent directional control of the light beam from the resonator so that it can be easily aimed into the chamber.

With the resonator, the wavelength of substantially any laser beam or other light source can be shifted to the frequency to which hydrogen is most sensitive before it is applied to the hydrogen.

In some instances it may be desirable to provide a conduit between the output of the laser and the input to the resonator and between the output of the resonator and the hydrogen chamber which can be evacuated to provide an obstacle (e.g. dust and air particles) free or obstacle reduced path for the light to the hydrogen chamber. It is also preferred that the resonator be evacuated to provide such obstacle free path. In addition, it may be desirable for the beam of light to enter the hydrogen chamber through the window at an angle to reduce or eliminate any reflection of the beam away from or out of the chamber.

A nitrogen laser is currently preferred because it produces light of higher frequencies, i.e. 3371 angstroms, than other currently known lasers. A resonator for increasing the light freqency acts similarly to a transformer. Thus, as the frequency of the light is increased, increasing the individual energy content of each photon of light, the overall energy content of the light beam is decreased. The more the frequency is increased, the more the overall power is decreased. For equivelent laser power outputs, the one requiring the smallest increase in frequency will provide the highest overall power output from the resonator.

The hydrogen chamber is preferably made as a pressure chamber so that hydrogen at a cold pressure of between 150 and 200 PSI fills the chamber. When activated and heated, the hydrogen pressure in the chamber may be as much as 6000 PSI and the chamber must be designed to accomodate such pressure. Of course, the initial hydrogen pressure could be lower, but the higher pressure provide more hydrogen molecules for disassociation purposes and ensures more efficient operation of the unit.

It should be noted that the hydrogen in the chamber is not consumed. The hydrogen molecules remain in the chamber and are repeatably disassociated and then recombined.

The temperature of the unit is controlled by the pulse rate and power content of the incoming laser light. Thus, temperature sensors could be used in conjunction with the heating element to measure its temperature and control the repetition rate of the laser.

The heating unit may generally be used in any application where heating elements are currently used. For example, the heating unit may be emersed in a tank of water as a water heater or boiler, or may be used as the heating elements in a forced air furnace.

In addition to the heating element as described above, the invention also includes the method of generating heat in a container through the steps of filling the container with hydrogen gas, directing high energy light into the hydrogen gas in the container to cause disassociation of the hydrogen molecules into hydrogen atoms, and allowing the hydrogen atoms to recombine to form hydrogen molecules which release heat.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A heating element comprising a sealed container of hydrogen gas, said container being formed of a material having good heat conducting properties; and means to direct high energy light into the hydrogen gas in the container to cause disassociation of the hydrogen molecules into hydrogen atoms whereby when the hydrogen atoms recombine to produce hydrogen molecules, heat is generated to heat the container.

2. A heating element according to claim 1, wherein the container of hydrogen gas includes a window in said container to allow passage of light from outside the container into the container.

3. A heating element according to claim 2, wherein the means to direct high energy light into the hydrogen is located outside the container and is adapted to produce a beam of high energy light and direct said beam through the window into the hydrogen within the chamber.

4. A heating element according to claim 3, wherein the means to direct high energy light is a laser.

5. A heating element according to claim 4, wherein the laser is a nitrogen laser.

6. A heating element according to claim 1, wherein the means to direct high energy light into the hydrogen is adapted to produce high energy light having a wavelength between about 500 and 2,000 angstroms.

7. A heating element according to claim 6, wherein the means to direct high energy light includes a laser to produce a beam of high energy light and a resonator to transform the wavelength of the light from the laser to between about 500 to 2,000 angstroms.

8. A heating element according to claim 7, wherein the container of hydrogen gas includes a window in said container to allow passage of light from outside the container into the container, wherein the resonator is located inside the container, and wherein the laser is located outside the container and is adapted to direct a beam of high energy light through the window into the resonator which, in turn, directs the light into the hydrogen in the container.

9. A heating element according to claim 8, wherein the laser is a nitrogen laser.

10. A heating element according to claim 7, wherein the container of hydrogen gas includes a window in said container to allow passage of light from outside the container into the container, and wherein the laser and resonator are located outside the container and arranged so that the high energy light from the laser is directed to the resonator which, in turn, directs the light through the window into the hydrogen in the container.

11. A heating element according to claim 10, wherein the laser is a nitrogen laser.

12. A heating element according to claim 11, wherein the laser produces pulses of high energy light and the temperature of the container is controlled by controlling the repetition rate of the pulses.

13. A heating element according to claim 1, wherein the means to direct high energy light into the hydrogen gas produces pulses of high energy light and the temperature of the container is controlled by controlling the repetition rate of the pulses.

14. A heating element according to claim 1, wherein the container has heat transfer fins extending therefrom.

15. A heating element according to claim 14, wherein the container is cylindrical.

16. A heating element according to claim 1, wherein the container is cylindrical.

17. A heating element according to claim 1, wherein the pressure of the hydrogen within the container at room temperature is between about 150 and 200 PSL.

18. A method of producing heat in a container comprising the steps of filling the container with hydrogen gas; directing high energy light into the hydrogen gas in the container to cause disassociation of the hydrogen molecules into hydrogen atoms; and allowing the hydrogen atoms to recombine to form hydrogen molecules thereby giving off heat.

19. A method according to claim 18, wherein the high energy light directed into the hydrogen gas has a wavelength between 500 and 2,000 anstroms.

* * * * *